May 7, 1929.  H. H. FEBREY  1,712,426
RAIL BOND
Filed Feb. 26, 1924
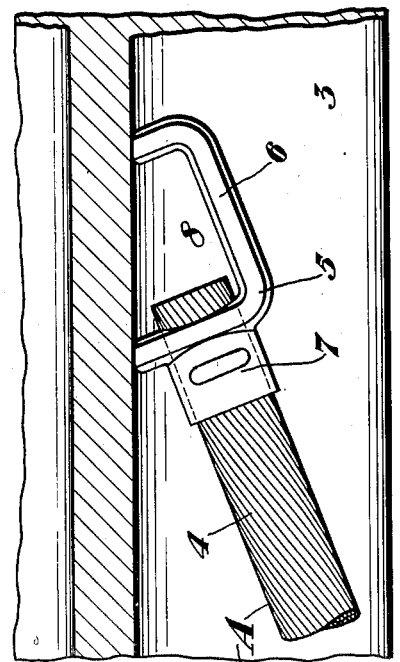
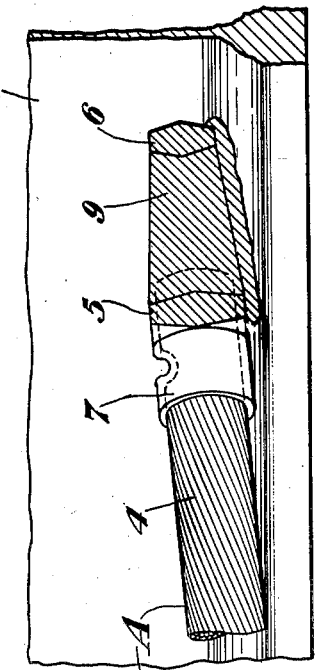
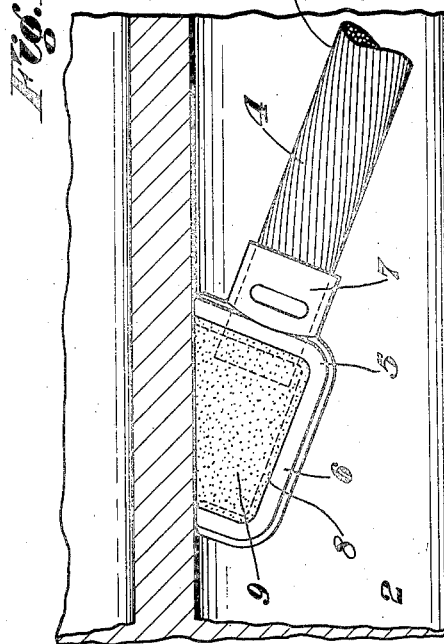
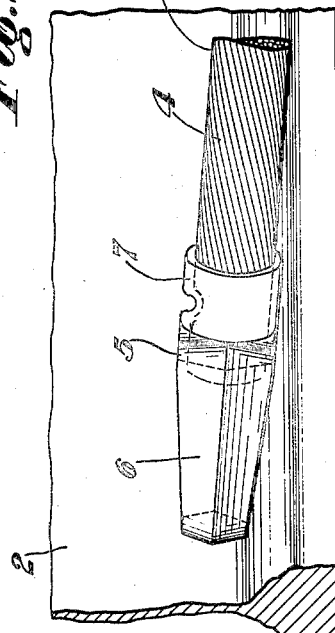
Witnesses:
Edwin Trueb
Inventor:
HAROLD H. FEBREY,
by: D. Anthony Usina
his Attorney.

Patented May 7, 1929.

1,712,426

UNITED STATES PATENT OFFICE.

HAROLD H. FEBREY, OF NEWARK, NEW JERSEY, ASSIGNOR TO THE AMERICAN STEEL AND WIRE COMPANY OF NEW JERSEY, A CORPORATION OF NEW JERSEY.

RAIL BOND.

Application filed February 26, 1924. Serial No. 695,210.

This invention relates to rail bonds and more particularly to rail bonds of the arc weld type adapted to be welded to the rail by an electric arc or similar welding process.

One object of the present invention is to provide a bond of this class having a novel form of terminal adapted to form a pocket to retain the molten attaching metal applied by the welding method.

Another object of this invention is to provide a bond of this class having a novel form of terminal construction whereby the bond conductor, terminal, and the rail are all secured together by the attaching metal deposited within the terminal.

A further object is to provide a bond having a bottomless terminal of ferrous metal adapted to co-operate with the base flange and web of a rail to form a retaining pocket for the attaching metal.

A still further object is to provide a rail bond of the arc weld type having the novel design, construction, and combination of parts hereinafter described and illustrated in the accompanying drawings.

In the drawings, Figure 1 is a plan view of the abutting ends of a pair of rails sectioned through the web, showing a rail bond constructed in accordance with this invention with its left hand terminal welded in position, and its right hand terminal positioned ready for welding.

Figure 2 is a side elevation of the abutting ends of a pair of rails having my novel bond positioned thereon, both terminals being welded in position and the right hand terminal being sectioned to show how the attaching metal will firmly secure the conductor, terminal and rail together.

Referring more particularly to the drawings, the numerals 2 and 3 designate the rails to be bonded and the letter A designates the rail bond as a whole.

The bond A comprises the usual cuprous metal flexible conductor 4 and ferrous metal terminals 5. The terminals 5 comprise a U-shaped or three sided, open bottom body portion 6 having an integral boss 7 formed on its one end and having an opening through the boss through which the end of the conductor 4 is passed into the body portion 6.

The body portion 6 of the terminals 5 are adapted to be positioned on the base flanges of the rails so that their open sides will be closed by the rail webs and their bottoms will be closed by the base flanges, thus forming retaining pockets 8 for the attaching metal 9. The attaching metal is adapted to be supplied by a copper alloy electrode, and as the body portion 6 is filled, the rail, conductor and terminal all become united by the fused metal, thereby forming a secure and positive electrical bond.

While I have shown only one preferred embodiment of my invention, it will be understood that I do not wish to be limited thereto, since various modifications may be made without departing from the scope of my invention as defined in the appended claims.

I claim:—

1. A rail bond adapted for welding to the base flange and web of a rail, and comprising a cuprous metal flexible conductor and ferrous metal terminals on the ends thereof, said terminals comprising a three-sided rim-like bottomless body portion consisting of a relatively long inner end wall, a relatively short outer end wall and a connecting side wall, a boss formed integral with said inner end wall and having an opening therethrough through which the end of said conductor projects into said body portion, said outer end wall tapering toward its free end from said connecting side wall and said connecting side wall tapering from said inner end wall toward said outer end wall, whereby said terminals may be positioned on the inclined top wall of the rail base flange with the ends of the end walls abutting the rail web so that the rail web will close the open side of said terminal and the base flange of the rail will close the bottom side of said terminal, thereby forming a metal receiving pocket closed on all but the top side and adapted to retain the attaching metal and to permit the rail, the conductor, and terminal to be united by the fused metal used in attaching the bond to the rail.

2. A rail bond adapted for welding to the base flange and web of a rail, and comprising a cuprous metal flexible conductor and ferrous metal terminals on the ends thereof, said terminals comprising a three-sided rim-like bottomless body portion consisting of a relatively long end wall, a relatively short end wall and a connecting side wall, a boss formed integral with one of said end walls and having an opening therethrough through which the end of said conductor projects into said body portion, said body portion being adapted to be positioned on the rail base flange of the rail so that the rail web will close its open side and the base flange will close the bottom, thereby forming a metal receiving pocket having a less area at one end than at the other and adapted to retain the attaching metal and to permit the rail, the conductor and the terminal to be united by the fused metal used in attaching the bond to the rail.

3. A rail bond adapted for welding to the base flange and web of a rail, and comprising a cuprous metal flexible conductor and ferrous metal terminals on the ends thereof, said terminals comprising a three-sided rim-like bottomless body portion consisting of a relatively long inner end wall, a relatively short outer end wall and a straight connecting side wall, a boss formed integral with said relatively long inner end wall and having an opening therethrough through which the end of said conductor projects into said body portion, said body portion being adapted to be positioned on the rail base flange of the rail so as to form a metal receiving pocket adapted to retain the attaching metal and to permit the rail, the conductor and the terminal to be united by the fused metal used in attaching the bond to the rail.

In testimony whereof I have hereunto set my hand.

HAROLD H. FEBREY.